(12) United States Patent
Niki

(10) Patent No.: US 9,589,248 B2
(45) Date of Patent: *Mar. 7, 2017

(54) INFORMATION PROCESSING APPARATUS, CONSUMABLES STOCK MANAGEMENT SYSTEM, CONSUMABLES STOCK MANAGING METHOD, CONSUMABLES STOCK MANAGING PROGRAM, AND MEMORY MEDIUM

(71) Applicant: CANON KABUSHIKI KAISHA, Tokyo (JP)

(72) Inventor: Toru Niki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/774,307

(22) Filed: Feb. 22, 2013

(65) Prior Publication Data

US 2013/0179310 A1 Jul. 11, 2013

Related U.S. Application Data

(63) Continuation of application No. 10/232,514, filed on Sep. 3, 2002, now Pat. No. 8,407,109.

(30) Foreign Application Priority Data

Sep. 13, 2001 (JP) ................. 2001-278054
Sep. 28, 2001 (JP) ................. 2001-299526

(51) Int. Cl.
*G06Q 10/00* (2012.01)
*G06Q 10/08* (2012.01)
*G03G 15/00* (2006.01)

(52) U.S. Cl.
CPC ................. *G06Q 10/087* (2013.01)

(58) Field of Classification Search
CPC .... G06Q 10/087; G06Q 20/203; G06Q 10/08; G06Q 10/0875; G06Q 10/06
USPC .......................................... 705/28
See application file for complete search history.

(56) References Cited

U.S. PATENT DOCUMENTS

| | | | |
|---|---|---|---|
| 4,737,910 A | 4/1988 | Kimbrow | |
| 5,303,005 A * | 4/1994 | Takano | G06F 11/0733 399/11 |
| 5,305,199 A | 4/1994 | LoBiondo et al. | |
| 6,154,619 A * | 11/2000 | Boockholdt | G03G 15/553 399/24 |
| 6,233,410 B1 * | 5/2001 | Seber | B41L 13/06 399/12 |
| 6,505,009 B2 * | 1/2003 | Henricus | G03G 21/12 399/35 |

(Continued)

FOREIGN PATENT DOCUMENTS

| | | |
|---|---|---|
| EP | 0 715 221 | 5/1996 |
| JP | 8-152824 | 6/1996 |

(Continued)

*Primary Examiner* — Garcia Ade
(74) *Attorney, Agent, or Firm* — Fitzpatrick, Cella, Harper & Scinto

(57) ABSTRACT

A frequency of a residual amount signal which includes the absence of consumables and is issued by a printing apparatus is analyzed, whether new consumables have been attached or not is properly discriminated, and proper stock management is made.

16 Claims, 11 Drawing Sheets

(56) References Cited

U.S. PATENT DOCUMENTS

| | | | |
|---|---|---|---|
| 6,572,318 B2* | 6/2003 | Cobene | B42C 19/02 399/24 |
| 6,813,395 B1 | 11/2004 | Kinjo | |
| 2001/0004734 A1 | 6/2001 | Kudoh et al. | |
| 2001/0037267 A1* | 11/2001 | Sato | G06Q 10/06 705/29 |

FOREIGN PATENT DOCUMENTS

| JP | 09-188042 | 7/1997 |
|---|---|---|
| JP | 2001-34685 | 2/2000 |

\* cited by examiner

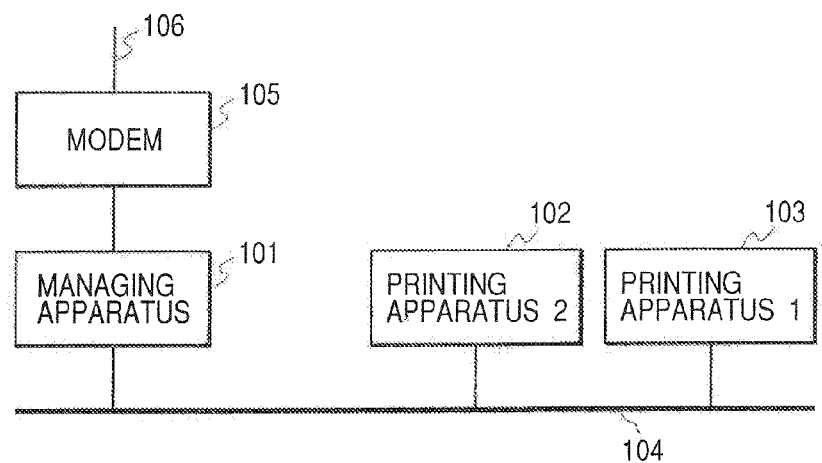
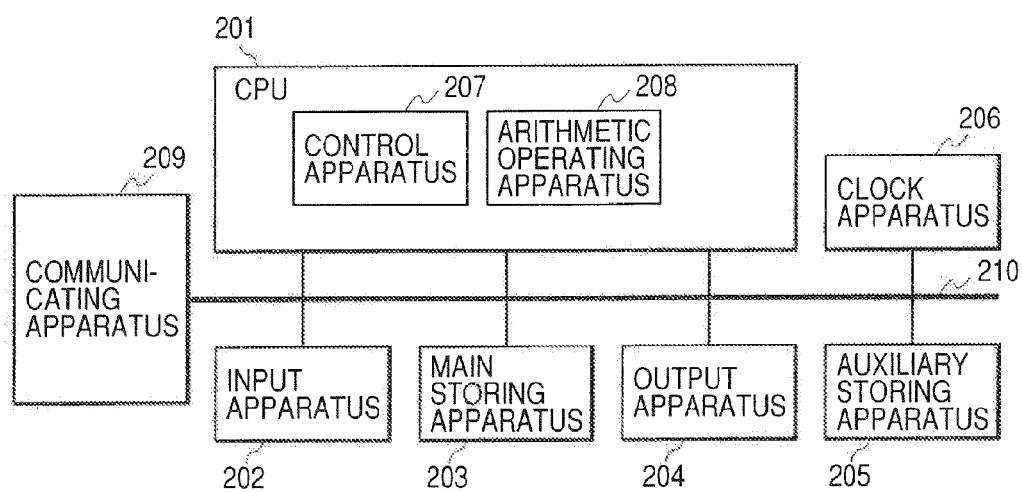

FIG. 5

BLACK AND WHITE TONER

| 501 | 502 |
|---|---|
| PRINTER 1000 OF C COMPANY | CTB10 |
| PRINTER 1100 OF C COMPANY | CTB10 |
| PRINTER 1200 OF C COMPANY | CTB10 |
| PRINTER 2000 OF C COMPANY | CTB20 |
| PRINTER 2100 OF C COMPANY | CTB20 |
| . . . . | . . . . |
| . . . . | . . . . |

FIG. 6

COLOR TONER (YELLOW)

| 601 | 602 |
|---|---|
| COLOR PRINTER 600 OF C COMPANY | CTY6 |
| COLOR PRINTER 610 OF C COMPANY | CTY6 |
| COLOR PRINTER 700 OF C COMPANY | CTY7 |
| COLOR PRINTER 710 OF C COMPANY | CTY7 |
| . . . . | . . . . |
| . . . . | . . . . |

INFORMATION PROCESSING APPARATUS, CONSUMABLES STOCK MANAGEMENT SYSTEM, CONSUMABLES STOCK MANAGING METHOD, CONSUMABLES STOCK MANAGING PROGRAM, AND MEMORY MEDIUM

This is a continuation of U.S. patent application Ser. No. 10/232,514, filed Sep. 3, 2002.

BACKGROUND OF THE INVENTION

Field of the Invention

The invention relates to an information processing apparatus, a system, a consumables stock managing method, a consumables stock managing program, and a memory medium in stock management of consumables which are used in a printing apparatus such as a printer, copying apparatus, or the like.

Related Background Art

As a conventional technique, for example, Japanese Patent Application Laid-Open No. 8-152824 "Printing apparatus and management system of printing apparatus" has been released. FIG. 11 is a diagram showing such a system. A managing apparatus 1101 to monitor statuses of a printing apparatus 1102 and a printing apparatus 1103 is connected to them via an LAN 1104. The managing apparatus 1101 is connected to a public line 1106 via a modem 1105. FIG. 12 is a flowchart showing a flow of processes of the managing apparatus. First, an administrator sets a minimum number Zn of stocks for every one of the consumables in step S1201. Subsequently, in S1202, whether an empty signal of toner has been received from the printing apparatus or not is discriminated. If NO, the processing routine is returned to this discriminating step and the system enters a waiting mode of the empty signal. If YES, the processing routine advances to S1203 and a code of the consumable corresponding to the printing apparatus from which the empty signal has been transmitted is obtained. In S1204, "1" is subtracted from the number of stocks of the consumables. If NO in S1202, another process is executed while waiting for the empty signal.

After S1204, the processing routine advances to S1205 and the present number of stocks is compared with the minimum number Zn of stocks set in S1201. If the present number of stocks is equal to or less than the minimum number of stocks, S1206 follows and a host computer is notified of this fact. If it is determined in S1205 that the present number of stocks is larger than the minimum number of stocks and after S1206, the system enters the waiting mode of the empty signal.

However, in the conventional consumables stock management system, since the subtraction of the stocks is performed every time the empty signal of a consumable is received from the printing apparatus, there is a drawback such that there is a case where the empty signal is received a plurality of number of times in dependence on a mechanism of empty detection of the printing apparatus or its notification, and in such a case, the accurate subtraction cannot be performed. In a printing apparatus such that the toner is supplied by a cartridge, if the user removes the cartridge from the printing apparatus and shakes it, the printing can be executed again for a little while. Also in this case, there is a problem such that the empty signal is generated a plurality of number of times during a short period of time and the accurate stock subtraction cannot be performed.

SUMMARY OF THE INVENTION

The invention is made in consideration of the above problems and according to the invention, there is provided an information processing apparatus for managing the number of stocks of consumables which are used in a printing apparatus from residual amount information which is notified by the printing apparatus which can communicate via a predetermined communication line, comprising: discriminating means for discriminating whether the printing apparatus or the consumable has been driven or used by a predetermined amount for a period of time from timing based on reception of an empty signal notified via the predetermined communication line until reception of the residual amount information or not; and managing means for managing an increase or a decrease in the number of stocks in accordance with a result of the discrimination of the discriminating means. According to this apparatus, accurate stock management can be realized by a relatively simple mechanism.

According to the invention, there is provided a consumables stock management system having a printing apparatus which can communicate via a predetermined communication line and an information processing apparatus for managing the number of stocks of consumables which are used in the printing apparatus from residual amount information which is notified by the printing apparatus, comprising: notifying means for notifying the system of the residual amount information detected by residual amount information detecting means via the predetermined communication line; discriminating means for discriminating whether the printing apparatus or the consumable has been driven or used by a predetermined amount for a period of time from timing based on reception of an empty signal notified by the notifying means via the predetermined communication line until reception of the residual amount information or not; and managing means for managing an increase or a decrease in the number of stocks in accordance with a result of the discrimination of the discriminating means. According to this system, accurate stock management can be realized by a relatively simple mechanism.

BRIEF DESCRIPTION OF THE DRAWINGS

FIG. 1 is a block diagram of a consumables stock management system according to the invention;

FIG. 2 is a block diagram of a typical information processing apparatus;

FIG. 5 shows an example of a table in which a correspondence relation between the kind of printing apparatus and the kind of consumables is stored;

FIG. 6 shows an example of a table in which a correspondence relation between the kind of printing apparatus and the kind of consumables is stored;

DETAILED DESCRIPTION OF THE PREFERRED EMBODIMENTS

First Embodiment

Figure 3:
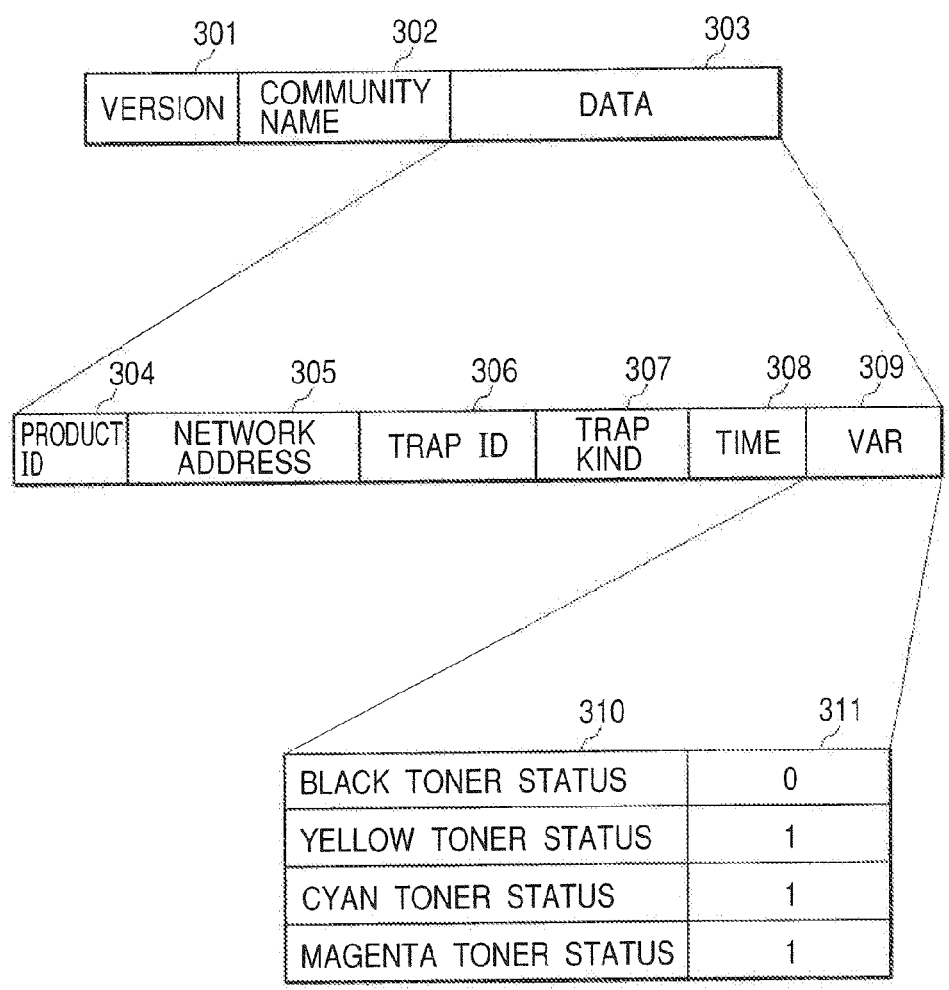
FIG. 3 is a diagram for explaining an MIB value which expresses an empty signal of residual amount information.

The first embodiment of the invention will be described hereinbelow with reference to the drawings.

FIG. 1 is a block diagram showing a schematic construction of a consumables stock management system according to the embodiment.

A managing apparatus (information processing apparatus) 101 to monitor statuses of consumables of a plurality of printing apparatuses 102 and 103 serving as management targets is connected to them via an LAN 104. The managing apparatus is connected to a public line 106 via a modem 105 and can communicate with a center of a back-end (back-end information processing apparatus) which is notified of an absence of stocks of the consumables. If a function of the modem 105 is included in the managing apparatus 101, a construction of the modem 105 can be omitted.

FIG. 2 is a typical block diagram showing functions of the information processing apparatus.

FIG. 2 is the block diagram showing a typical hardware construction of the information processing apparatus and corresponds to the managing apparatus (information processing apparatus) of FIG. 1. Further, this information processing apparatus has a construction including the function of the modem 105 and comprises: a CPU (Central Processing Unit) 201; an input apparatus 202; a main storing apparatus 203; an output apparatus 204; an auxiliary storing apparatus 205; a clock apparatus 206; and a communicating apparatus 209.

The CPU 201 is a device also called a processing apparatus as another name and comprises: a control apparatus 207 for sending a command to each apparatus in the system and controlling the operations of those apparatuses; and an arithmetic operating apparatus 208 for executing an arithmetic operating process of digital data.

The CPU 201 functions as each means of the invention in cooperation with programs stored in the main storing apparatus 203 and the auxiliary storing apparatus 205.

Further, the CPU 201 functions as storing means for storing information into the main storing apparatus 203 and the auxiliary storing apparatus 205 and updating means for updating the information stored in those storing apparatuses.

The control apparatus 207 reads out data inputted from the input apparatus 202 and procedures (for example, program or software) which have previously been given, stores them into the main storing apparatus 203 in accordance with timing of clocks which are generated from the clock apparatus 206, sends commands to the arithmetic operating apparatus 208 on the basis of contents of the read-out procedures, and allows the arithmetic operating apparatus 208 to execute an arithmetic operating process. A result of the arithmetic operating process is transmitted to internal apparatuses such as main storing apparatus 203, output apparatus 204, auxiliary storing apparatus 205, and the like, external apparatuses, or the like on the basis of control of the control apparatus 207.

The input apparatus 202 is a device for inputting various data and, for example, the following devices are presumed: a keyboard; a mouse; a pointing device; a touch panel; a mouse pad; a CCD camera; a card reader; a paper tape reading apparatus; a magnetic tape apparatus; etc.

The main storing apparatus 203 is a device also called a memory as another name and is a device corresponding to all addressable memory spaces which are used to execute the commands in the processing apparatus and the internal storing apparatuses. The main storing apparatus 203 is mainly constructed by a semiconductor memory device, stores and holds the inputted programs and data, and reads out the stored and held data to, for example, a register in accordance with an instruction of the control apparatus 207.

A RAM (Random Access Memory), a ROM (Read Only Memory), or the like is used as a semiconductor memory device constructing the main storing apparatus 203.

The output apparatus 204 is a device for outputting the arithmetic operation result or the like of the arithmetic operating apparatus 208. For example, a display apparatus such as CRT, plasma display panel, liquid crystal display, or the like, a printing apparatus such as a printer or the like, an audio output apparatus, or the like corresponds to the output apparatus.

The auxiliary storing apparatus 205 is a device for compensating a memory capacity of the main storing apparatus 203. For example, a floppy disk, a hard disk, a CD-ROM, a CD-R, a CD-RW, an MO, or the like constructed by a magnetic disk apparatus, an optical disk apparatus, a semiconductor disk apparatus, or the like corresponds to the auxiliary storing apparatus. The auxiliary storing apparatus 205 functions as storing means for storing data for constructing various databases.

The communicating apparatus 209 is a device for communicating with an external apparatus and properly executes transmission and reception of data, a digital/analog conversion, or the like in accordance with a network which is connected.

The above apparatuses are mutually connected by an address bus or a data bus.

Figure 13:
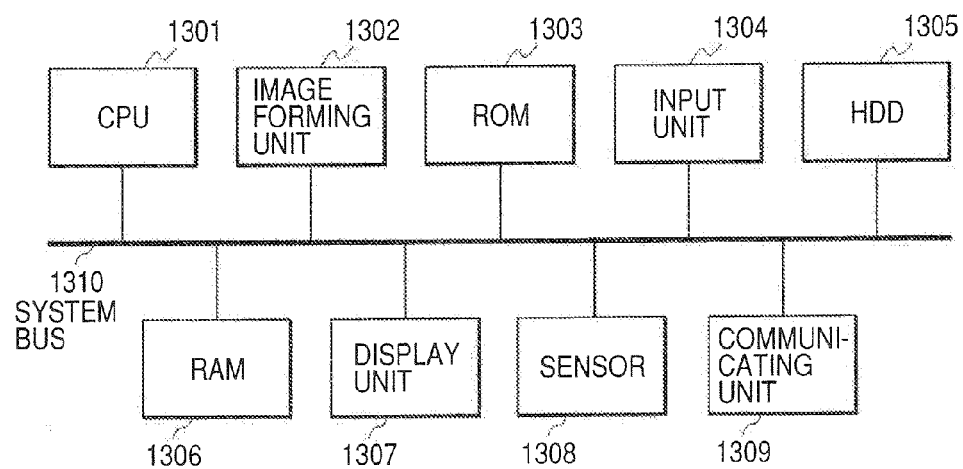
FIG. 13 is a block diagram of a typical printing apparatus.

FIG. 13 is a block diagram showing a typical construction of a printing apparatus according to the invention.

A CPU 1301 is a central processing unit serving as control means and controls component elements 1302 to 1309 via a system bus 1310.

Reference numeral 1302 denotes an image forming unit having a function for converting image data which is supplied from the outside via a communicating unit or image data which is read out by an image reading unit (not shown) into a video signal and forming an image onto a predetermined recording medium.

A ROM 1303 and an HDD 1305 denote nonvolatile memory means. Various data, program codes (including a control program of the invention) which are read out by the CPU, or the like have been stored in them. The program codes which are stored are read out by the CPU 1301 and used for various processes.

An input unit 1304 is input means for inputting in accordance with an instruction from the user. As a preferred example, a keyboard, a mouse, a liquid crystal touch panel, or an operation button can correspond to the input unit.

A RAM 1306 is a portion for temporarily storing data and has a function for storing print data received via the communicating unit and a function as a main storage work area for the CPU.

A display unit 1307 is display means for displaying various display information on the basis of control of the CPU 1301. As a preferred example, a liquid crystal display unit, a CRT, or the like can correspond to the display unit.

A sensor 1308 is detecting means having a function for detecting a use amount/a residual amount of consumables such as toner, ink, or the like which is used in the printing apparatus, a function for detecting a fault of the printing apparatus, or a function for counting the number of print sheets. The sensor 1308 reads an electric signal or detects a mechanical structure. For example, information showing the residual amount detected by the sensor 1308 is displayed by the display unit 1307 or notified to an external information processing apparatus via a communicating unit 1309. The communicating unit 1309 has a function for making bidirectional communication with an external apparatus via a predetermined communication cable or a predetermined communication network. Specifically speaking, the unit 1309 corresponds to means which makes communication via a communication cable such as 10BASE-T or the like and has a communicating function according to a communication protocol such as RS-232C, Ethernet, or the like or a network communicating function according to a TCP/IP protocol or the like.

As a printing apparatus in the invention, it is presumed that printing apparatuses in the following various forms can be applied: that is, a laser beam printer using an electrophotographic system; an ink jet printer using an ink jet system; a thermal printer using a thermal transfer system; a copying apparatus; a facsimile apparatus; a digital hybrid apparatus having functions of a copying apparatus, a printer, and the like; etc.

The printing apparatus in the embodiment of the invention will be further specifically explained. When it is recognized that an amount of consumables in the printing apparatus is equal to or less than a threshold value, an empty signal for notifying the system of a result of the recognition is supplied to the managing apparatus by response information from the printing apparatus in accordance with a trap of an SNMP (Simple Network Management Protocol) or an information request (polling) from the managing apparatus to the printing apparatus.

FIG. 3 shows an example of a data structure of the empty signal. Reference numeral 301 denotes a version of an MIB; 302 a community name; and 303 data. Contents in the data 303 further have a structure as shown at 304 to 309. Reference numeral 304 denotes a product ID (ID which is allocated to each product at the time of shipping from a factory or upon user registration); 305 a network address (IP address); 306 a trap ID; 307 a kind of trap; 308 time; and 309 a data portion of a variable length. A specific status of the empty signal is written in the data portion 309. As a status of the consumables, the kind of consumable (even in the case where the kinds of printing apparatuses are different, a situation that the consumables of the same kind are used is presumed) is described in an area 310. The status is described in an area 311. If a residual amount of consumables is equal to or less than a threshold value, "0" is stored in the status 311. If it is larger than the threshold value, "1" is stored in the status 311. In this example, a residual amount of only the black toner is equal to or less than the threshold value. In each process of the managing apparatus, which will be explained below, FIG. 3 described above can be applied to the information notified by the printing apparatus.

Subsequently, a flow of processes of the invention will be described with reference to a flowchart of FIG. 4. It is assumed that a process in each step of the flowchart of FIG. 4 is realized in accordance with the operation such that the CPU provided in the managing apparatus shown in FIG. 2 reads out and executes the control program of the invention stored in the nonvolatile memory means such as ROM, hard disk, or the like.

First, in step S401, a process for setting the minimum number $Z_n$ of stocks which is used for notifying a back-end center of the absence of the consumables with respect to the consumables of a consumables code n is executed. This setting process is executed for every kind of consumables. The consumables code n indicates the kind of consumables. This setting process indicates storage into a storing unit of the managing apparatus. As an inputting method, there is presumed a method whereby the number $Z_n$ is inputted from input means provided for the managing apparatus in accordance with an input by the user or a method whereby the number $Z_n$ is registered on the basis of a signal indicative of the minimum number $Z_n$ of stocks which is transmitted via the predetermined communication line.

Figure 4:
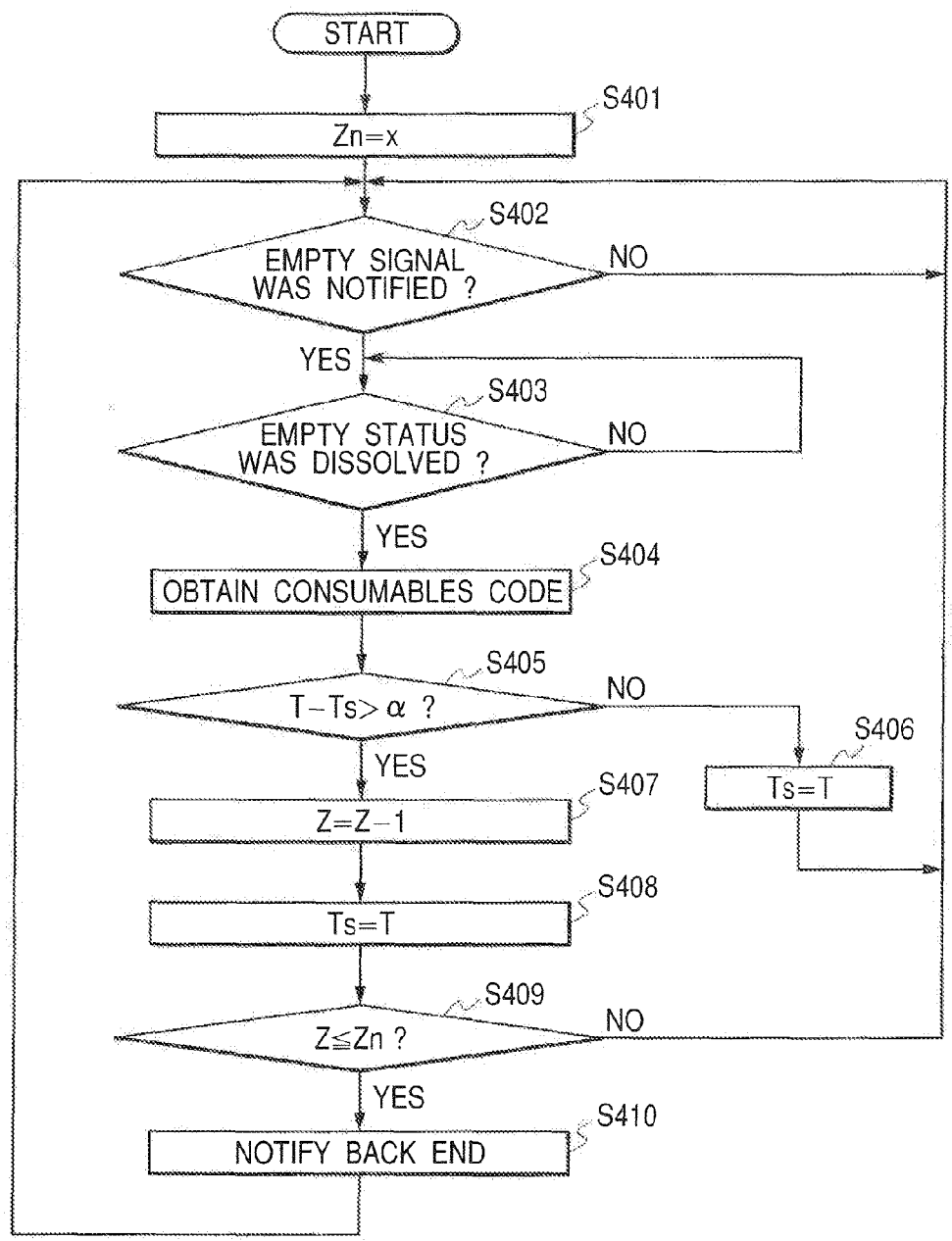
FIG. 4 is a flowchart showing a flow of processes of a managing apparatus (information processing apparatus) in the first embodiment.

The process of step S401 can be also executed asynchronously with the processes shown in the flowchart of FIG. 4.

Subsequently, in step S402, whether the empty signal of the consumables has been notified by the printing apparatus via the network or not is discriminated. As an example of the empty signal, the signal shown in FIG. 3 described above can be applied. If it is determined that the empty signal has been notified, the processing routine advances to step S403. As also described above, a network address (IP address: address information of 32 bits which is used in the IP protocol) is included in the empty signal shown in FIG. 3 which is notified in step S402. Processes in steps S402 to S406 and S408, which will be explained below, are managed for every network address. A table in which the printing apparatus (for example, product ID) has been made to correspond to each network address has been stored and held. Managing every network address can be changed to managing every printing apparatus. Various information (reference time Ts and the like, which will be explained below) which is managed in correspondence to each network address has been held in a predetermined storing unit (corresponding to the main storing apparatus 203 or the auxiliary storing apparatus 205 in FIG. 2) of the managing apparatus and is properly referred to. The printing apparatus can be also individually identified from the product ID or the like in FIG. 3 in place of the network address.

In step S403, a status of the consumables of the printing apparatus of an empty signal generating source in step S402 is monitored (corresponding to a process for checking the information indicative of the residual amount of the consumables which is transmitted from the printing apparatus) at predetermined intervals. If the empty status is dissolved, step S404 follows.

In step S404, a process for searching the consumables code of the printing apparatus from the prepared table is executed. This searching process is a process for searching which event regarding which consumables the empty signal notified by the printing apparatus concerns. This process is realized by using a table in which the consumables codes corresponding to the model names of the printing apparatuses have been stored.

The model name of each printing apparatus which is specified by the managing apparatus is realized by the following mechanism. First, the managing apparatus obtains information indicative of the model name defined by the regulations such as MIB or the like from the printing apparatus via the predetermined communication line in accordance with a communication system such as an SNMP or the like. The obtained information indicative of the model name is held in the predetermined nonvolatile memory means in correspondence to the network address (an address obtained from the printing apparatus). Actually, an address-model name table in which the model names have been made to correspond to the network addresses corresponding to a plurality of printing apparatuses is held. A process for specifying the model name of the printing apparatus as a transmitting source of the empty signal by receiving the empty signal (including the network address) described in FIG. 3 mentioned above is executed. As another method, it is also possible to construct in a manner such that the information showing the model names of the printers is included in the information shown in FIG. 3 and the managing apparatus recognizes the information of the model names included in the notified information, so that the model name of the printing apparatus on the generating source side of the empty signal is specified. It is assumed that processes in steps S405 to S409, which will be explained below, are executed with respect to the consumables of each printing apparatus discriminated in step S404. It is also possible to construct in a manner such that the process in each of steps S405, S406, and S408, which will be explained below, is executed for every printing apparatus and the processes in S407 and S409 are executed for every one of the consumables corresponding to the printing apparatus discriminated in step S404.

Examples of search tables are shown in FIGS. 5 and 6.

FIG. 5 shows the example of the table for searching the consumables of black and white toner. A name (model name) which specifies the printing apparatus is stored in a column 501 and a name of toner corresponding to the printing apparatus is stored in a column 502.

FIG. 6 shows the example of the table for searching the consumable of color toner. In the color toner, since four colors of yellow, magenta, cyan, and black are used, this table has a structure such that the toner name can be searched from the name of the printing apparatus for every color.

The table as shown in FIG. 5 is not limited to the table in which the name (model name) which specifies the printing apparatus and the toner name (name of the consumable) corresponding thereto have been stored, but any table can be applied to the invention so long as a table in which identification information which can identify the printing apparatus and identification information which can identify the consumable have been stored in correspondence to each other. In such a case, the information which is notified to the managing apparatus by the printing apparatus is allowed to correspond to the identification information for identifying the printing apparatus. If the printing apparatus notifies the managing apparatus of the identification information for identifying its own apparatus and the consumables identification information for specifying the consumables, a load of the managing apparatus in association with the searching processes described above can be reduced.

Subsequently, in step S405, present time T is compared with the reference time Ts. If a difference between them is longer than a predetermined reference length ($\alpha$), step S407 follows. If it is not longer than ($\alpha$), step S406 follows. As also described above, the reference time Ts is managed for every printing apparatus (the printing apparatus is distinguished by the network address) or for every one of the consumables. The time information of the present time T and the reference time Ts corresponds to information which is obtained by installing a program for executing a timer function into the managing apparatus.

As an initial value of Ts, it is presumed that time at a point when the consumable such as toner or the like has been used in the printing apparatus for the first time or time at a point when the printing apparatus has been driven for the first time is set, or "0" or a negative value whose absolute value is equal to or larger than $\alpha$ is set so that the processing routine advances certainly to the process of step S406 in the case where the process of step S405 is executed for the first time.

In step S406, the present time T is set into the reference time Ts. After that, the apparatus enters a waiting mode of the empty signal (step S402).

When the processing routine advances from step S405 to step S407, "1" is subtracted from the number Z of stocks of the consumable of the kind corresponding to the consumables code obtained in step S404.

Step S408 follows and the present time T is set into the reference time Ts in a manner similar to step S406. In steps S406 and S408, the present time in the strict sense or the time when the empty signal has been received in step S402 can be also used.

After step S408, the present number Z of stocks is compared with the minimum number Zn of stocks in step S409. If the present number of stocks is equal to Zn, step S410 follows and a notification indicative of the absence of the stocks is transmitted to the back-end center (information processing apparatus set in the back-end center) via the modem.

The notification to the back-end center in step S410 is realized on the basis of E-mail address information which has been preset in the managing apparatus.

After step S406 or S410, the apparatus again enters the empty signal waiting mode (step S402).

Figure 7:
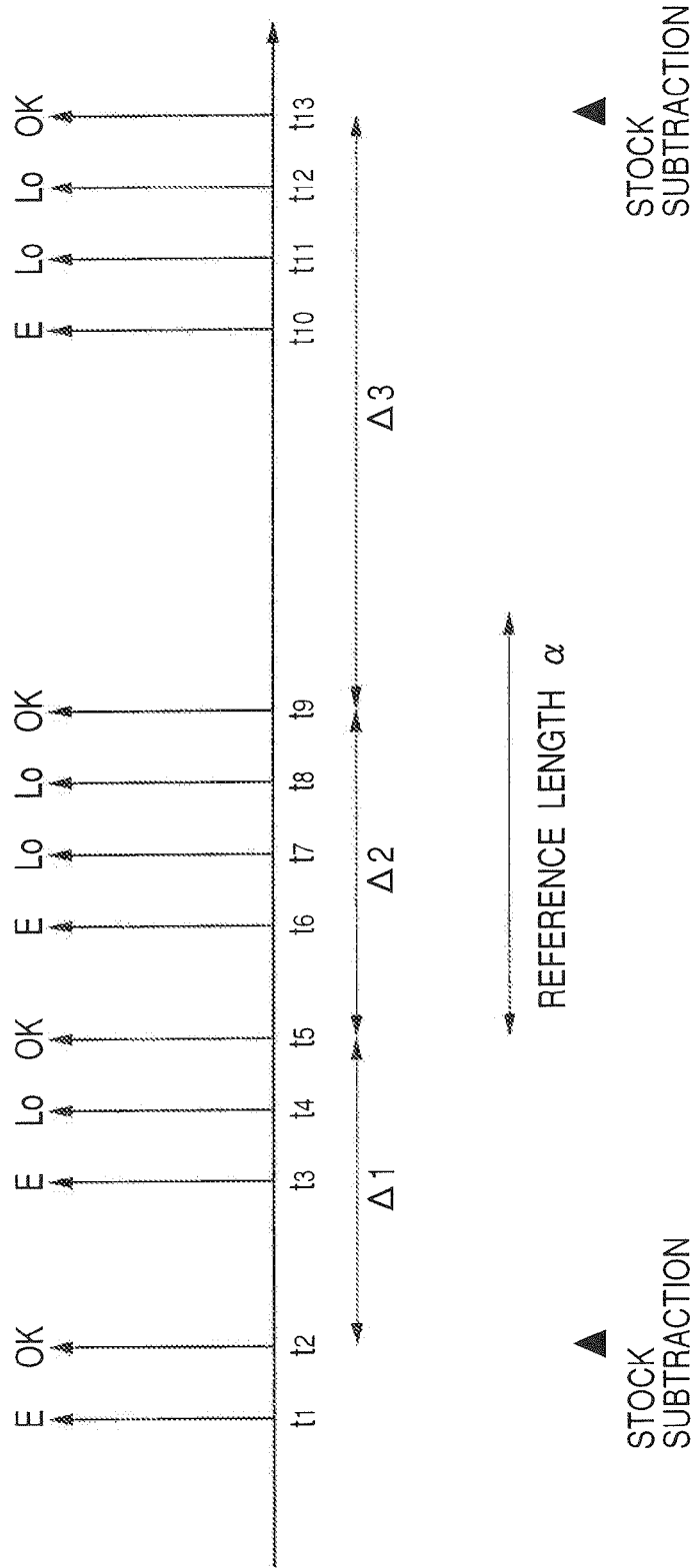
FIG. 7 is a diagram of a time sequence for explaining a logic of a subtraction according to the managing apparatus (information processing apparatus) in the first embodiment.

The processes in the foregoing flow will be described further in detail with reference to a diagram of a time sequence of FIG. 7. The time chart of FIG. 7 is actually executed for every printing apparatus (which is distinguished by the network address) or for every one of the consumables (which are distinguished by the unique consumables identification information). The discriminating processes based on the time chart of FIG. 7 are realized by a method whereby the CPU provided for the managing apparatus shown in FIG. 2 reads out and executes the control program of the invention stored in the nonvolatile memory means such as ROM, hard disk, or the like.

An axis of abscissa in FIG. 7 indicates the time and the right direction shows an elapse of time. In FIG. 7, "E" denotes a detection event of the absence of consumables by the empty signal. "Lo" shows that the stocks are still in the empty status as a result of the monitor. "OK" denotes that the empty status has been dissolved as a result of the monitor. With respect to the dissolution of the empty status, for example, in the case where the consumables are a cartridge in which a consumable material has been enclosed and which is detachable to/from the printing apparatus, it is generally known that by once removing the cartridge from the printing apparatus and shaking it or the like, a state where the residual amount is temporarily recovered is detected or the like. Naturally, a case where the user has newly attached a cartridge which is sufficiently filled with the consumable material into the printing apparatus or the like is also presumed.

The notification of the empty signal from a predetermined printing apparatus is recognized at elapsed time t1 from the start of the operation of the system. After that, when the empty dissolution status is obtained, that is, in a first dissolution status t2, "1" is unconditionally subtracted from the number of stocks. On the other hand, in the subsequent dissolution status, for example, at t5, a difference between t5 and the one-preceding dissolution status (time point when the empty has been dissolved) t2, that is, $$\Delta 1 = t5 - t2$$

is compared with the fixed reference time $\alpha$.

If $\Delta 1 < \alpha$, the stock subtraction at time t5 is not executed. The control program of the invention determines that since the exchange of the consumables is not actually performed at t2, the empty signal is generated again.

As mentioned above, according to the control of the invention, the stock subtraction is not executed at t5 but is executed at t2. This is considered as a process in which an effect such that the correct value is obtained as the number of stocks and an overlapped process for subtracting the number of stocks is prevented can be obtained.

Similarly, also at subsequent empty dissolution status t9, since a difference between t9 and the previous empty status t5, that is, $$\Delta 2 = t9 - t5$$

is smaller than $\alpha$, the subtraction of the number of stocks is not executed.

On the other hand, in an empty dissolution status t13, since a difference between t13 and t9, that is, $$\Delta 3 = t13 - t9$$

is larger than $\alpha$, it is determined that the new consumable have been exchanged again. "1" is subtracted from the number of stocks. The execution of the exchange of the new consumables will be specifically explained. The consumables have actually been exchanged at time t9. t13 shows a point when the empty status is dissolved by some operation although the empty status occurred for the first time after the consumable had newly been exchanged.

The reference time $\alpha$ (corresponding to a in step S405 in FIG. 4) is preliminarily theoretically or experimentally determined from the average consumption amount of the consumable. The fact that $\Delta 3$ is larger than $\alpha$ as described above denotes that after the empty status was once dissolved because the consumables had been exchanged to the consumable of an enough residual amount, the empty status again occurs and it takes a long enough time until the empty status is further dissolved again.

In FIGS. 4 and 7, the explanation has been made with respect to the processes for discriminating the time interval between the timing when the empty status occurs and is subsequently dissolved and the timing when the empty status again occurs and this empty status is dissolved. However, for example, the processes in FIGS. 4 and 7 can be presumed in a form such that an interval between the timing based on the generation of the empty signal (reception from the position of the information processing apparatus) and the timing based on the re-generation of the empty signal is discriminated, such as a form such that an interval between the timing when the empty status occurs and the timing when the empty status again occurs is discriminated, a form such that an interval between the timing when the empty status occurs and is subsequently dissolved and the timing when the empty status again occurs is discriminated, or the like.

The interval is not limited to the elapsed time but, for example, another parameter such as the number of print sheets or the like can be also used as an interval as will be also explained in the third embodiment.

As described above, according to the first embodiment, when a sufficiently long time elapses as an interval from the timing when the empty status of the residual amount of the consumables is dissolved to the timing when a similar status again occurs, it is determined that the consumables are newly exchanged. Therefore, a situation such that the number of stocks is subtracted in an overlapping manner is prevented.

The invention can be also applied to a printing apparatus of a low price which does not have a construction such as cartridge memory, function to count the number of print sheets, or the like for producing information to predict exchanging timing of the consumables.

Second Embodiment

Figure 8:
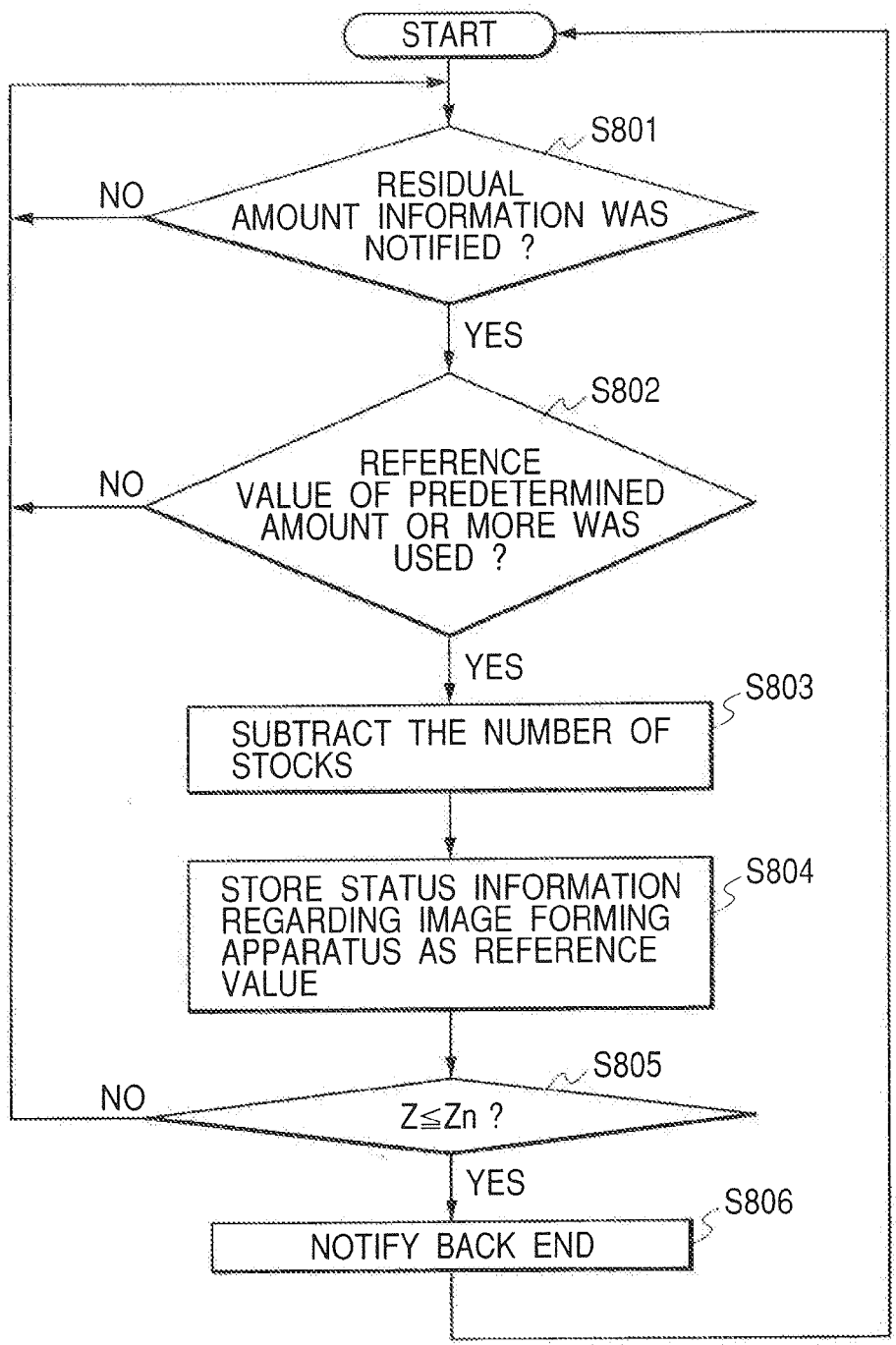
FIG. 8 is a flowchart showing a flow of processes of a managing apparatus (information processing apparatus) in the second embodiment.

A flow for processes in the second embodiment will be described with reference to a flowchart of FIG. 8. It is assumed that a process of each step in the flowchart of FIG. 8 is realized by a method whereby the CPU provided in the managing apparatus shown in FIG. 2 reads out and executes the control program of the invention stored in the nonvolatile memory means such as ROM, hard disk, or the like. In a manner similar to FIGS. 4 and 7 or the like, it is assumed that the processes in the flowchart (particularly, steps S801 to S804) in FIG. 8 are executed for every printing apparatus (which is distinguished by the network address) or for every one of the consumables (which are distinguished by the unique consumables identification information). As residual amount information, the empty information as described above or information showing that the empty status has been dissolved can be made to correspond to it.

In step S802, whether the printing apparatus has been operated or the consumables have been used by a predetermined distance/amount from a reference value or not is discriminated.

As a reference value in the embodiment, time, the accumulated number of print sheets, a pixel count number (every color), or the like which is obtained at the time when the information processing apparatus recognizes a fact that the consumables have been newly exchanged at the previous time corresponds to it. Time when the empty signal is received, the number of print sheets obtained by driving the printing apparatus or consuming the consumables, a pixel count number, or the like which is obtained just before it is determined that the consumables have been newly exchanged can be also made to correspond to it.

If NO in step S802, the processing routine is returned to step S801. If YES, step S803 follows.

In step S803, a process for subtracting the number of stocks is executed. The consumables code (the kind of consumables) at the time when the number of stocks is subtracted in step S803 is specified in a manner similar to the mechanism described in step S404 in FIG. 4. A model name is specified by using the address-model name table described above on the basis of the network address of the printing apparatus of the signal generating source of the residual amount information received in step S801. Further, by using the tables as shown in FIGS. 5 and 6, the kind of consumables in which the number of stocks should be managed (subtracted) is specified from the specified model name. It is also possible to allow the model name of the printing apparatus to be included in the residual amount information (or information shown in FIG. 3). It is also presumed that the process for subtracting the number of stocks can be also replaced with a process for counting the number of used consumables.

In step S804, the information showing the time when the residual amount information has been notified in step S801, the number of print sheets obtained by driving the printing apparatus or consuming the consumables, the pixel count number, or the like is stored into a predetermined storing unit and, thereafter, used as reference data in step S802.

In step S805, whether the number of stocks of the target consumable is equal to or less than a threshold value or not is discriminated. If NO, the processing routine is returned to step S801. If YES, the back-end (back-end information processing apparatus) which can be communicated with the outside is notified of a fact that the number of stocks is equal to or less than the threshold value. After completion of the notification, the processing routine is returned to step S801.

The processes shown in the flowchart of FIG. 8 are executed for every kind of consumable (every identification information which is notified to the managing apparatus by the printing apparatus. The determination of the printing apparatus and the kind of consumable can be accomplished by using the mechanism described above with reference to FIGS. 3, 5, and 6.

The second embodiment of the invention will be described further in detail with reference to a diagram of a time sequence of FIG. 9. Discriminating processes based on the time chart shown in FIG. 9 are realized by a method whereby the CPU provided in the managing apparatus shown in FIG. 2 reads out and executes the control program of the invention stored in the nonvolatile memory means such as ROM, hard disk, or the like.

In the first embodiment, the time difference between the time when the empty status is dissolved and the previous time when the empty status has been dissolved is compared with the fixed reference value, thereby recognizing the exchange of the consumables. In the second embodiment, however, a process such that a time difference between the time when the empty status is dissolved and time when the stock subtraction has been made before is compared with the fixed reference value, thereby discriminating the subtraction of the number of stocks will be described.

Figure 9:
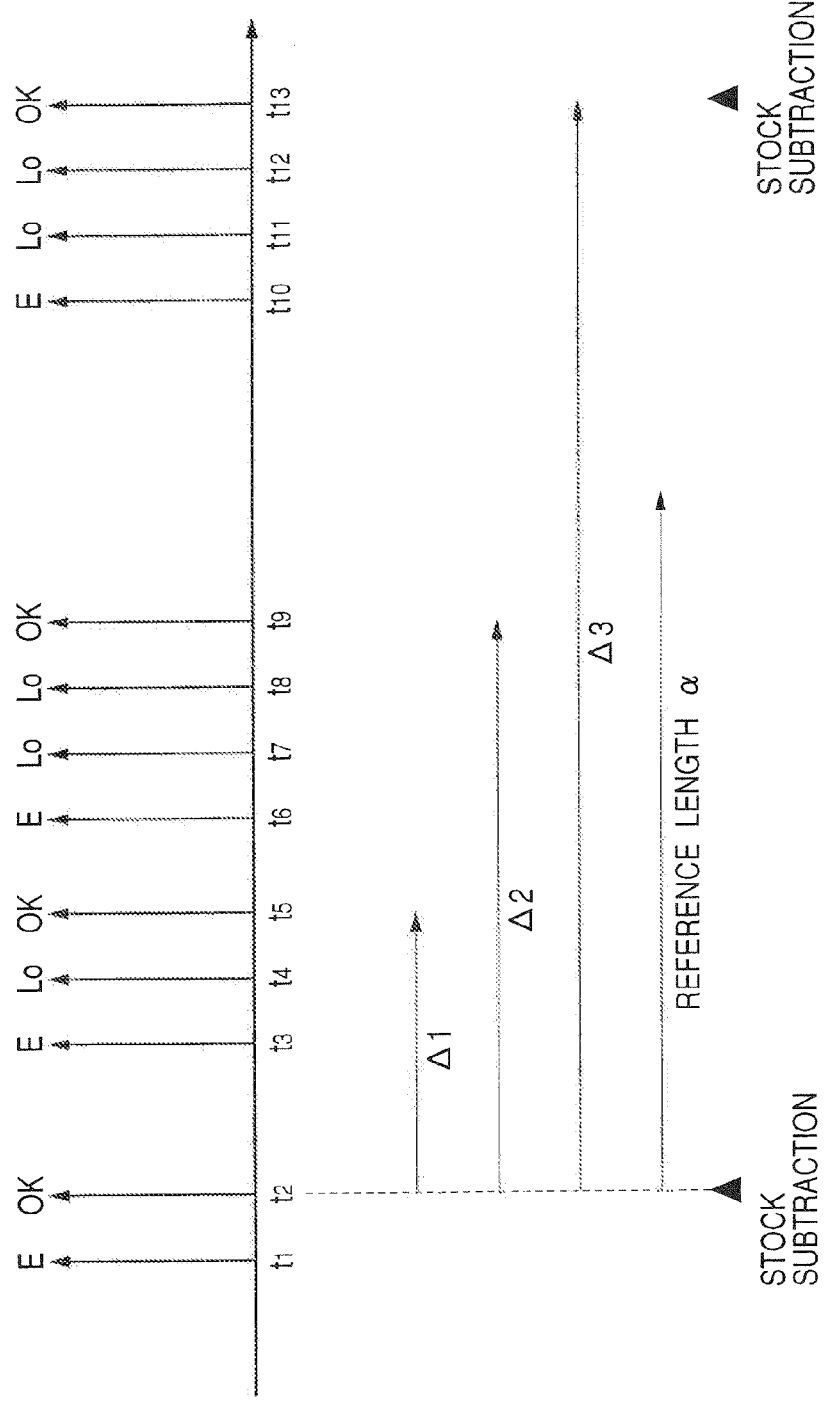
FIG. 9 is a diagram of a time sequence for explaining a logic of a subtraction according to the managing apparatus (information processing apparatus) in the second embodiment.

In the example of FIG. 9, the stock subtraction is executed at the time of the first toner dissolution status t2 in a manner similar to the first embodiment. Although the toner dissolution status is obtained at t5, t9, and t13, when the time differences between t2 and (t5, t9, and t13), that is, $\Delta 1 = t5 - t2$ $\Delta 2 = t9 - t2$ $\Delta 3 = t13 - t2$ are compared with the fixed reference value α, since only Δ3 is larger than α, "1" is subtracted from the number of stocks at t13. However, the subtraction is not executed at other timing t5 and t9.

The invention is not limited to the form such that the information (time, the number of print sheets, pixel count number, etc.) which is obtained at t2 but, for example, there is also presumed a form such that the empty signal just before it is recognized that the consumable has been exchanged to the new consumable is generated and information (time, the number of print sheets, pixel count number, etc.) which is obtained at timing when the managing apparatus is notified of the generation of the empty signal is used as a reference.

Third Embodiment

In the third embodiment, a process for discriminating whether the stock subtraction is executed in accordance with the number of print sheets which are obtained by driving the printing apparatus or consuming the consumables which are used in the printing apparatus will be described.

Figure 10:
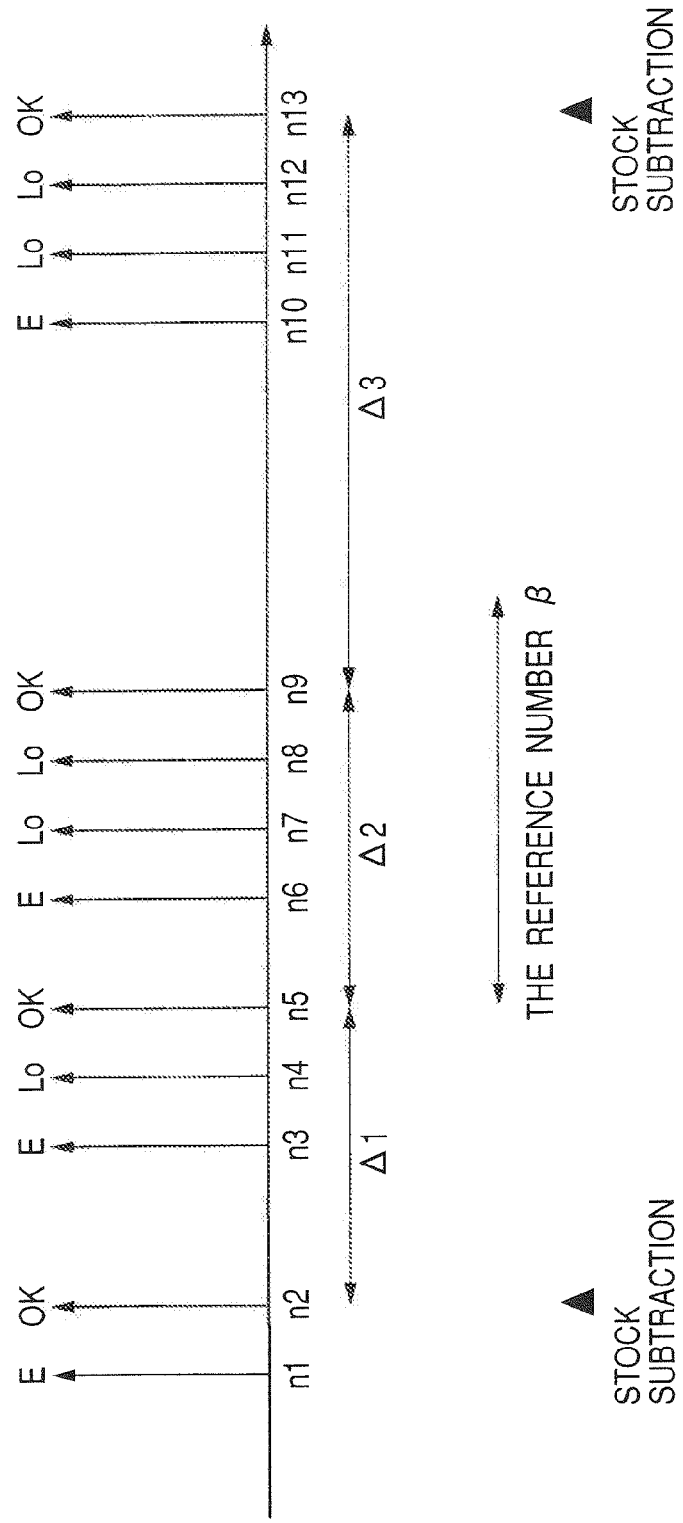
FIG. 10 is a diagram of a time sequence for explaining a logic of a subtraction according to a managing apparatus (information processing apparatus) in the third embodiment.
Figure 11:
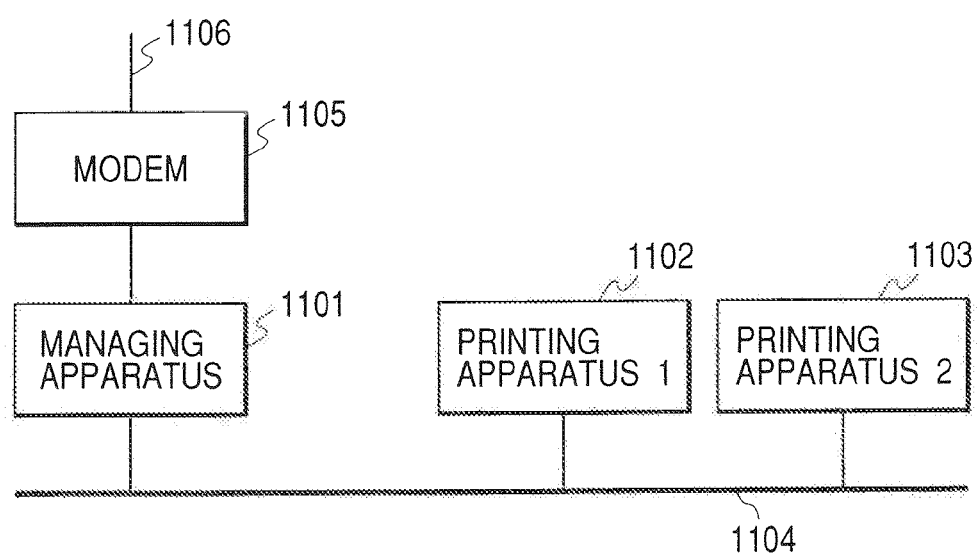
FIG. 11 is a diagram of a system in a conventional example.
Figure 12:
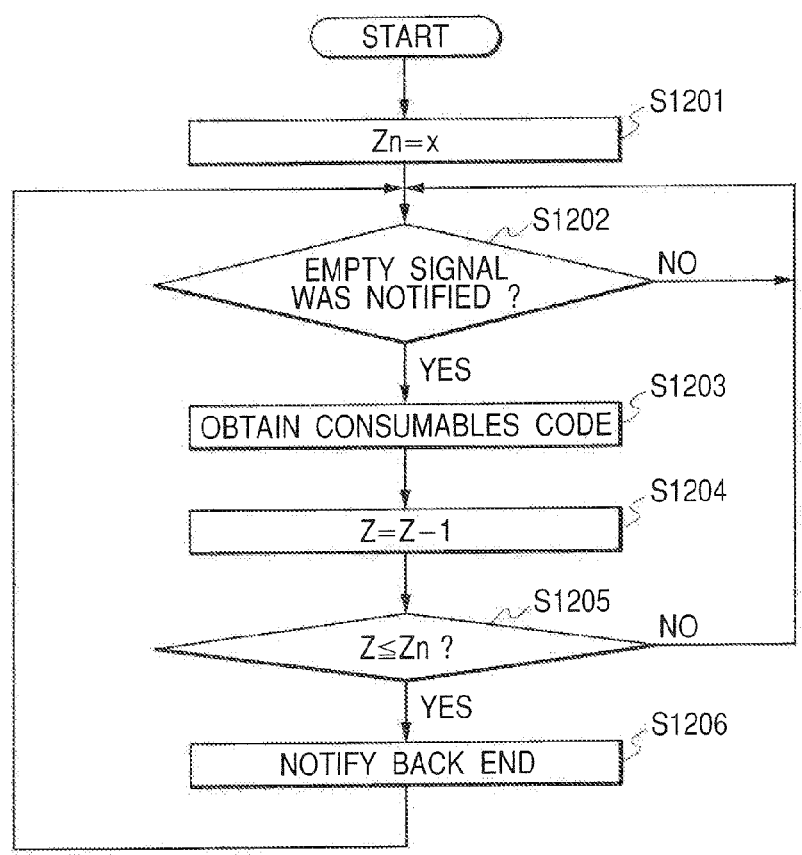
FIG. 12 is a flowchart showing a flow of processes in the conventional example.

A flow of processes in the third embodiment will be described with reference to a time chart of FIG. 10. The discriminating process based on the time chart shown in FIG. 10 is realized by a method whereby the CPU provided in the managing apparatus shown in FIG. 2 reads out and executes the control program of the invention stored in the nonvolatile memory means such as ROM, hard disk, or the like. In a manner similar to FIGS. 4 and 7 and the like, it is assumed that the time chart of FIG. 10 is executed for every printing apparatus (which is distinguished by the network address) or for every one of the consumables (which are distinguished by the unique consumables identification information).

In FIG. 10, although an axis of abscissa indicates the elapsed time, the discrimination is made on the basis of the number of print sheets (count value) which is obtained from the printing apparatus.

As also described in FIG. 13, it is assumed that the printing apparatus in the embodiment has a well-known counting function for counting the number of print sheets in response to a notification of completion of the printing and a function for notifying the managing apparatus of the count value obtained by the counting function via a predetermined network.

n* denotes a count value of the printing apparatus at a certain point of time. The information of the count value indicative of the number of print sheets corresponds to the information notified to the managing apparatus by the printing apparatus via a predetermined communication line.

"E" denotes the detection event of the absence of consumables by the empty signal. "Lo" shows that the stocks are still in the empty status as a result of the monitor. "OK" denotes that the empty status has been dissolved as a result of the monitor. Each of those pieces of information corresponds to the information which is notified via the predetermined communication line in response to a form of the event or a polling request to the printing apparatus from the managing apparatus.

After the start of the operation of the system, the empty signal is generated from the target printing apparatus in an empty status n1 and notified to the managing apparatus by the printing apparatus. After that, when the empty dissolution status is notified by the printing apparatus, that is, in a first dissolution status n2, "1" is unconditionally subtracted from the number of stocks. On the other hand, in subsequent dissolution statuses, for example, in a dissolution status n5, a difference between n5 and the one-preceding dissolution status n2, that is, $\Delta 1 = n5 - n2$ is compared with a fixed reference number β.

If Δ1<β, the stock subtraction in the status n5 is not executed. This process corresponds to a process based on a discrimination result showing that since the exchange of the consumables is not actually performed in n2, the empty signal is also generated. In this case, since the subtracting process of the stocks is not executed in n5 but the subtracting process of the stocks is executed in n2, a correct value is obtained as the number of stocks without executing the overlapping stock subtracting process.

Similarly, also in a subsequent empty dissolution status n9, a difference between n9 and the preceding empty status n5, that is, $$\Delta 2 = n9 - n5$$

is smaller than $\beta$. Therefore, the subtraction is not performed.

On the other hand, in an empty dissolution status n13, since $$\Delta 3 = n13 - n9$$

is larger than $\beta$, it is determined that the new consumables are exchanged again, and the process for subtracting "1" from the number of stocks is executed.

The reference number $\beta$ is preliminarily theoretically or experimentally determined from the average consumption amount of the consumables.

Although the processes in which the number of print sheets is used as a parameter has been described in the third embodiment, a case where the form using the number of print sheets as a parameter is applied to the second embodiment is also presumed in the invention.

The invention is not limited to the elapsed time and the number of print sheets as parameters but, for example, a case of using a pixel count number obtained by counting the number of pixels as described above or the like is also presumed.

Fourth Embodiment

In the fourth embodiment, an explanation will be made with respect to a process such that the elapsed time and the number of print sheets serving as parameters in the discriminating process (step S405 or the like) described in the first to third embodiments are selectively switched and used in accordance with the kind of printing apparatus.

First, the managing apparatus obtains the identification information (information such as network address, model name, or the like which can specify the printing apparatus) of the printing apparatus as a monitor target via the predetermined communication line.

Whether the printing apparatus which is specified in accordance with the obtained identification information is a printing apparatus having the function for counting the number of print sheets or not is discriminated. This discrimination is realized by a method whereby the managing apparatus searches a memory table which is provided in the managing apparatus and in which the identification information of the printing apparatus and each function including at least the function for counting the number of print sheets have been made to correspond to each other. It is also possible to construct the system in a manner such that the managing apparatus inquires of the printing apparatus about each function, the information regarding the function is obtained from the printing apparatus, or the information is voluntarily transmitted from the printing apparatus.

If it is determined that the printing apparatus has the function for counting the number of print sheets, the stock managing process using the number of print sheets as described in the third embodiment is selected. If it is determined that the printing apparatus does not have the function for counting the number of print sheets, the stock managing process using the elapsed time as a parameter as described in the second embodiment is executed.

By the above construction, even in an environment such that various kinds of printing apparatuses in a range from an apparatus of a low function to an apparatus of a high function exist, the managing apparatus can execute the flexible stock management of the consumables.

The invention can be applied to a system comprising a plurality of apparatuses (for example, a host computer, an interface apparatus, a reader, a printer, etc.) or can be also applied to an apparatus (a copying apparatus, a printer, a facsimile apparatus, or the like) comprising one piece of equipment.

The object of the invention is also accomplished by a method whereby a memory medium in which program codes of software for realizing the functions of the embodiments mentioned above have been stored is supplied to a system or an apparatus, and a computer (or a CPU or an MPU) of the system or the apparatus reads out and executes the program codes stored in the memory medium.

In this case, the program codes themselves read out from the memory medium realize the functions of the embodiments mentioned above, and the memory medium in which the program codes have been stored or the program codes themselves construct the invention.

As a memory medium for supplying the program codes, for example, a floppy disk, a hard disk, an optical disk, a magnetooptic disk, an MO, a CD-ROM, a CD-R, a DVD, a magnetic tape, a nonvolatile memory card, a ROM, or the like can be used.

The invention incorporates not only a case where the functions of the embodiments mentioned above are realized by a method whereby a computer executes the read-out program codes but also a case where an OS (Operating System) or the like which operates on a computer executes a part or all of actual processes on the basis of instructions of the program codes and the functions of the embodiments mentioned above are realized by those processes.

Further, the invention also incorporates a case where the program codes read out from a memory medium are written into a memory equipped for a function expanding board inserted in a computer or a function expanding unit connected to a computer and, thereafter, a CPU or the like equipped for the function expanding board or function expanding unit executes a part or all of actual processes on the basis of instructions of the program codes, and the functions of the embodiments mentioned above are realized by those processes.

As described above, according to the invention, there is an effect such that the stock management of the consumables of the printing apparatus can be more accurately executed without erroneously performing the stock subtraction in an overlapping manner, so that the stock management of the consumables of high precision can be made.

Even under a print environment such that a plurality of printing apparatuses are connected so that they can communicate with each other via the predetermined communication line, since each printing apparatus (or consumables) can be identified and individually managed, the stock management of the consumables can be certainly made even for a plurality of printing apparatuses (or consumables).

What is claimed is:
1. A system including:
a printing apparatus; and
an information processing apparatus for managing a stock number of a consumable detachably placed in the printing apparatus, wherein the printing apparatus is configured to process input image data and comprises:
(1) a first sensor that counts a number of print sheets as information indicative of an operation of the printing apparatus or a consumable placed in the printing apparatus;
(2) a second sensor that detects a residual amount of contents in the consumable; and
(3) a transmitter that transmits a notification to the information processing apparatus,
wherein the information processing apparatus comprises a receiver that receives the notification via communication from the transmitter of the printing apparatus and is configured, for enabling management of the stock number of the consumable detachably placed in the printing apparatus by referring to operation information of the printing apparatus, to compute, with respect to a plurality of notifications of the residual amount related to the consumable placed in the printing apparatus received by the receiver at a plurality of timings, a change of information indicative of the operation of the printing apparatus or the consumable in a period corresponding to the plurality of notifications,
wherein the printing apparatus comprises a processor functioning as a network communicator that controls so that the transmitter transmits, to the information processing apparatus, a notification of the residual amount related to the consumable, the notification including the number of print sheets counted by the first sensor and the residual amount detected by the second sensor,
wherein the information processing apparatus comprises a processor functioning as:
(1) a controller that performs a control of the stock number of the consumable based on a first notification received by the receiver, in accordance with a computed change of information indicative of an operation of the printing apparatus or the consumable in a period between a previous notification of the residual amount related to the consumable and the first notification exceeding a predetermined value, without controlling the stock number of the consumable according to reception of a second notification by the receiver, in accordance with the computed change of information indicative of the operation in a period between the previous notification and the second notification not exceeding the predetermined value; and
(2) a comparison unit that compares the stock number of the consumable with a threshold based on which it is determined whether or not a notification related to the stock number of the consumable is to be transmitted, when the controller performs the control of the stock number of the consumable, and
wherein the previous notification is a notification which the controller had used for controlling the stock number of the consumable, and
wherein the number of print sheets included in the previous notification is stored, in a storage device of the information processing apparatus, for computing the change of information indicative of the operation of the printing apparatus or the consumable in the period corresponding to the plurality of notifications.

2. The system according to claim 1, wherein the consumable is a toner cartridge.

3. The system according to claim 1, wherein the notification indicates entering into a low residual amount or exiting out of a low residual amount.

4. The system according to claim 1, wherein the processor is further configured to function as a discriminator that computes the change of information for each of a plurality of printing apparatuses.

5. The system according to claim 1, wherein the notification of the residual amount related to the consumable is a response to an event or to a request for information.

6. The system according to claim 1, wherein the information processing apparatus further comprises:
an input device that inputs a stock threshold value; and
a storage device that stores the stock threshold value input by the input device.

7. The system according to claim 1, wherein the information processing apparatus further comprises a management device that manages the information indicative of the operation corresponding to the notification of the residual amount.

8. A method carried out in a system including (a) a printing apparatus and (b) an information processing apparatus for managing a stock number of a consumable detachably placed in the printing apparatus,
wherein the printing apparatus is configured to process input image data and comprises:
(1) a first sensor that counts a number of print sheets as information indicative of an operation of the printing apparatus or a consumable placed in the printing apparatus;
(2) a second sensor that detects a residual amount of contents in the consumable; and
(3) a transmitter that transmits a notification to the information processing apparatus,
wherein, the information processing apparatus is configured, for enabling management of the stock number of the consumable detachably placed in the printing apparatus by referring to operation information of the printing apparatus, to compute, with respect to a plurality of notifications of the residual amount related to the consumable placed in the printing apparatus received by the receiver at a plurality of timings, a change of information indicative of the operation of the printing apparatus or the consumable in a period corresponding to the plurality of notifications,
wherein the printing apparatus comprises a processor functioning as a network communicator that controls so that the transmitter transmits, to the information processing apparatus, a notification of the residual amount related to the consumable, the notification including the number of print sheets counted by the first sensor and the residual amount detected by the second sensor,
wherein the method comprises:
(1) transmitting, from the printing apparatus to the information processing apparatus, the notification to the information processing apparatus, wherein the information processing apparatus comprises a processor functioning as a receiver, a controller, and a comparison unit;
(2) receiving, by the receiver in the information processing apparatus via communication from the transmitter of the printing apparatus, the notification;
(3) by the controller in the information processing apparatus, controlling the stock number of the consumable based on a first notification, received by the receiver, in accordance with a computed change of information indicative of an operation of the printing apparatus or the consumable in a period between a previous notification of the residual amount related to the consumable and the first notification exceeding a predetermined value, without controlling the stock number of the consumable according to reception of a second notification by the receiver, in accordance with the computed change of information indicative of the operation in a period between the previous notification and the second notification not exceeding the predetermined value; and (4) comparing, by the comparison unit in the information processing apparatus, the stock number of the consumable with a threshold based on which it is determined whether or not a notification related to the stock number of the consumable is to be transmitted, when the controller performs the control of the stock number of the consumable, wherein the previous notification is a notification which the controller had used for controlling the stock number of the consumable, and wherein the number of print sheets included in the previous notification is stored, in a storage device of the information processing apparatus, for computing the change of information indicative of the operation of the printing apparatus or the consumable in the period corresponding to the plurality of notifications.

9. The method according to claim 8, wherein the information indicative of the operation indicates time information, a number of print sheets on the printing apparatus, or pixel count number on the printing apparatus.

10. The method according to claim 8, wherein the consumable is a toner cartridge.

11. The system according to claim 1, wherein, in the printing apparatus, the transmitter is able to transmit, to the information processing apparatus, a plurality of notifications each indicating exiting out of a no-residual-amount state in response to a plurality of detections of the no-residual-amount state with respect to one consumable.

12. The method according to claim 8, wherein, in the printing apparatus, the transmitting is able to transmit, to the information processing apparatus, a plurality of notifications each indicating exiting out of a no-residual-amount state in response to a plurality of detections of the no-residual-amount state with respect to one consumable.

13. The system according to claim 1, wherein, in the printing apparatus, the transmitter is able to transmit, to the information processing apparatus, a plurality of notifications each indicating a low-residual-amount state in response to a plurality of detections of the low-residual-amount state with respect to one consumable.

14. The system according to claim 1, wherein the controller performs, based on the first notification received by the receiver, the control of the stock number such that the stock number is decreased by one.

15. The method according to claim 8, wherein, in the printing apparatus, the transmitting is able to transmit, to the information processing apparatus, a plurality of notifications each indicating a low-residual-amount state in response to a plurality of detections of the low-residual-amount state with respect to one consumable.

16. The method according to claim 8, wherein the controlling performs, based on the received first notification, the control of the stock number such that the stock number is decreased by one.

* * * * *